United States Patent
Sundstrom

(10) Patent No.: US 9,141,258 B2
(45) Date of Patent: Sep. 22, 2015

(54) METHOD AND SYSTEM FOR AUTOMATICALLY ASSOCIATING A CURSOR WITH A HOTSPOT IN A HYPERVIDEO STREAM USING A VISUAL INDICATOR

(75) Inventor: Robert J. Sundstrom, Cary, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 2259 days.

(21) Appl. No.: 11/856,989

(22) Filed: Sep. 18, 2007

(65) Prior Publication Data

US 2009/0077503 A1    Mar. 19, 2009

(51) Int. Cl.
G06F 3/048 (2013.01)
G06F 3/0481 (2013.01)
G06F 3/0484 (2013.01)

(52) U.S. Cl.
CPC ........ *G06F 3/04812* (2013.01); *G06F 3/04842* (2013.01)

(58) Field of Classification Search
CPC .. G06F 3/0481; G06F 3/04812; G06F 3/0482
USPC .................. 715/856, 857, 859, 860, 861, 862
See application file for complete search history.

(56) References Cited

U.S. PATENT DOCUMENTS

| | | | |
|---|---|---|---|
| 5,327,528 A | 7/1994 | Hidaka et al. | |
| 5,508,717 A | 4/1996 | Miller | |
| 5,539,871 A | 7/1996 | Gibson | |
| 5,708,845 A * | 1/1998 | Wistendahl et al. | 715/202 |
| 5,786,805 A | 7/1998 | Barry | |
| 5,805,165 A | 9/1998 | Thorne et al. | |
| 5,819,092 A | 10/1998 | Ferguson et al. | |
| 6,031,531 A | 2/2000 | Kimble | |
| 6,075,537 A | 6/2000 | Adapathya et al. | |
| 6,154,771 A | 11/2000 | Rangan et al. | |
| 6,169,573 B1 | 1/2001 | Sampath-Kumar et al. | |
| 6,175,840 B1 | 1/2001 | Chen et al. | |
| 6,339,440 B1 | 1/2002 | Becker et al. | |
| 6,462,763 B1 * | 10/2002 | Mostyn | 715/856 |
| 6,570,587 B1 | 5/2003 | Efrat et al. | |

(Continued)

OTHER PUBLICATIONS

Worden, A., et al., "Making Computers Easier for Older Adults to Use: Area Cursors and Sticky Icons," CHI Atlanta, GA, 1997, Copyright 1997 ACM 0-8979 1-802-9/97/03, Mar. 22-27, 1997, 6 pages.

(Continued)

*Primary Examiner* — Thanh Vu

(57) ABSTRACT

Methods and systems are described for automatically linking a cursor to a hotspot in a hypervideo stream comprising a plurality of video frames that are associated with at least one user selectable hotspot. One method includes establishing an association between a selectable hotspot in a first activation region of a first video frame received for presentation in a video presentation space and a cursor when a first position of the cursor is within the first activation region corresponding to the selectable hotspot. The method also includes receiving a second video frame that includes the selectable hotspot in a second activation region different from the first activation region, and determining whether a second position of the cursor is outside of the second activation region of the second video frame. Responsive to the determination, the second video frame is presented with a visual indicator associating the cursor with the selectable hotspot based on the association between the cursor and the selectable hotspot.

22 Claims, 5 Drawing Sheets

(56) References Cited

U.S. PATENT DOCUMENTS

| | | | |
|---|---|---|---|
| 6,714,215 | B1 | 3/2004 | Flora et al. |
| 6,788,284 | B1 | 9/2004 | Culler |
| 6,912,726 | B1 | 6/2005 | Chen et al. |
| 7,137,068 | B1 | 11/2006 | Robin |
| 2002/0161909 | A1 | 10/2002 | White |
| 2003/0023459 | A1 | 1/2003 | Shipon |
| 2003/0189670 | A1 | 10/2003 | Kennedy et al. |
| 2004/0021684 | A1 | 2/2004 | Millner |
| 2004/0189714 | A1 | 9/2004 | Fox et al. |
| 2004/0233233 | A1 | 11/2004 | Salkind et al. |
| 2008/0201734 | A1 | 8/2008 | Lyon et al. |

OTHER PUBLICATIONS

Koenen, R., ed., "Overview of the MPEG-4 Standard," International Organization for Standardisation Organization Internationale De Normalization ISO/IEC JTC1/SC29/WG11 Coding of Moving Pictures and Audio, N4668, Mar. 2002, 78 pages.

Grossman, T., et al., "The Bubble Cursor: Enhancing Target Acquisition by Dynamic Resizing of the Cursor's Activation Area," CHI 2005, Copyright 2005 ACM 1-58113-998-5/05/0004, Apr. 2-7, 2005, 10 pages.

"Clickable Video Hypervideo Video Hotspotting," [online] VideoClix, © 2007 [retrieved on May 22, 2007] Retrieved from the Internet: <URL: http://www.elinetech.com/videoclix_product_tour.html> 4 pages.

\* cited by examiner

2001 Ford Escape

Base Price $17,850

The 2001 Escape is a 4-door, 5 passenger SUV available in four trims, ranging from the XLS FWD.

2001 Ford Escape

Base Price $17,850

The 2001 Escape is a 4-door, 5 passenger SUV available in four trims, ranging from the XLS FWD.

2001 Mitsubishi Montero

Base Price $31,397

The 2001 Montero is a 4-door, 7-passenger, full-size SUV available in two trims, the XLS and Limited.

METHOD AND SYSTEM FOR AUTOMATICALLY ASSOCIATING A CURSOR WITH A HOTSPOT IN A HYPERVIDEO STREAM USING A VISUAL INDICATOR

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

CROSS-REFERENCE TO RELATED APPLICATIONS

The present application is related to co-pending U.S. patent application Ser. No. 11/769,280, entitled "METHOD AND SYSTEM FOR AUTOMATICALLY LINKING A CURSOR TO A HOTSPOT IN A HYPERVIDEO STREAM," filed on Jun. 27, 2007, commonly owned with the present application, and incorporated here by reference in its entirety. In addition, the present application is also related to U.S. patent application Ser. No. 11/769,280, entitled "METHOD AND SYSTEM FOR PRESENTING A HOTSPOT IN A HYPERVIDEO STREAM," filed on Jun. 27, 2007 and commonly owned with the present application.

BACKGROUND

Hypervideo is a displayed video stream that includes user selectable anchors, referred to as "hotspots," that are linked to ancillary information. When a user views a hypervideo clip and selects the hotspot, the user can navigate from the video clip to the linked ancillary information. For example, a hotspot can be associated with an element in the video clip, such as a red automobile, and when selected, additional information about the automobile can be presented to the user, or a different video clip or a different segment of the same clip can be shown to the user.

In order to associate hotspots with elements in a hypervideo stream, it is necessary to track the position of the individual elements within the video clips used. Thus, when the exemplary red automobile is moving, the hypervideo media player system must be able to determine when the hotspot associated with the automobile has been selected, regardless of where it is on the screen when the selection is made. For video clips created artificially, e.g., by computer graphics, element tracking is relatively simple because the position of an element is specified on a coordinate system and that information can be then used to track the element. For video clips created from or based on live footage, however, element tracking is more complex. The video clip comprises a plurality of video frames, where each frame represents a still picture or "snapshot" of a particular moment in time. While each video frame contains visual information sufficient to permit the human brain to distinguish individual elements, such visual information does not generally enable a computer system to recognize the elements.

Nevertheless, several hypervideo authoring systems have been developed that support element tracking through the generation of hotspots that move with the element. FIGS. 1A, 1B and 1C illustrate three (3) exemplary video frames, 10A, 10B, and 10C, of a hypervideo stream that includes moving elements. In FIG. 1A, the first video frame 10A includes a first element, e.g., an automobile, that is associated with a first hotspot 12A. As is shown, the first hotspot 12A can be a defined region, referred to as an activation region, that can be similar in shape and size to the first element with which it is associated.

For the sake of clarity, the first hotspot 12A is represented by a rectangular box that generally encompasses the first element. In other instances, the defined region of a hotspot associated with an element is not displayed to the user. Rather, the appearance of a cursor 100, or any pointer indication, can change when the cursor 100 position is within the activation region of a hotspot. For example, when the cursor 100 is within a hotspot, the cursor 100 can appear as a pointing finger, otherwise the cursor 100 can appear as an arrow. Typically, when a viewer places the cursor 100 over the first element and selects the first element, the viewer effectively activates the associated first hotspot 12A. In this example, when the first hotspot 12A is activated, information 14A about the first element associated with the first hotspot 12A is presented.

In FIG. 1B, the second video frame 10b includes the first element and a second element, the rear automobile, that is also associated with a second hotspot 12b. As is shown, the first hotspot 12A is in a different location and has a different shape/size because the first hotspot 12A is tracking the location and shape/size of the first element. Generally, because the first element is "moving" away from the camera, its relative size is decreasing and thus, the size of the first hotspot 12A is also decreasing. As the size of the hotspot 12A decreases with each successive video frame (assuming the first element continues to travel away from the camera), it can be increasingly difficult for the viewer to place the cursor 100 on the first element to activate the associated first hotspot 12A. Thus, in FIG. 1C, while the viewer has placed the cursor 100 near the first element and selected what the viewer thinks is the first element, the cursor placement and selection actually has activated the second hotspot 12B, which is associated with the second element. As a result, information 14b about the second element associated with the second hotspot 12B is presented.

For some users, positioning the cursor 100 over a stationary graphical display element, such as an icon or hypertext link, can be difficult. In some instances, a user may exhibit diminished visual or physical abilities, or lack training and practice to correctly position the cursor 100. This difficulty is exacerbated in a hypervideo stream because elements captured in video clips, and their associated hotspots, are typically moving, and even if the element itself is physically stationary, the camera may be panning or zooming, thereby resulting in perceived movement.

Moreover, difficulties in positioning the cursor 100 properly can be attributable to the computer system itself. For example, a computer display can provide a high density presentation of material, rendering graphical display elements relatively small. Similarly, small computer displays, such as those for palm-held devices, may make graphical display elements difficult to select. In addition to user abilities and hardware limitations, the content displayed may include small elements, such as jewelry, with correspondingly small hotspots, making user selection with a pointing device difficult.

As illustrated above, inaccurate cursor positioning can result in mistakenly activating a hotspot associated with another element. With hypervideos, this mistake is particularly frustrating because the video stream continues for a specified time. To correct the mistake, the user must either replay the video clip or stop the presentation of the video clip and/or rewind it to some point. Moreover, the mistakenly activated hotspot can produce completely unintended results, which can be detrimental to the user. For example, in FIG. 1C, the viewer can mistakenly believe that he is reading information 14B about the front automobile, when in fact, the information 14B pertains to the rear automobile.

Accordingly, there exists a need for methods, systems, and computer program products for helping a user to track and activate a hotspot associated with an element in a hypervideo.

SUMMARY

Methods and systems are described for automatically linking a cursor to a hotspot in a hypervideo stream comprising a plurality of video frames that are associated with at least one user selectable hotspot. One method includes establishing an association between a selectable hotspot in a first activation region of a first video frame received for presentation in a video presentation space and a cursor when a first position of the cursor is within the first activation region corresponding to the selectable hotspot. The method also includes receiving a second video frame that includes the selectable hotspot in a second activation region different from the first activation region, and determining whether a second position of the cursor is outside of the second activation region of the second video frame. Responsive to the determination, the second video frame is presented with a visual indicator associating the cursor with the selectable hotspot based on the established association between the cursor and the selectable hotspot.

In another aspect of the subject matter disclosed herein, a system for automatically linking a cursor to a hotspot in a hypervideo stream includes means for establishing an association between a selectable hotspot in a first activation region of a first video frame received for presentation in a video presentation space and a cursor when a first position of the cursor is within the first activation region corresponding to the selectable hotspot, means for receiving a second video frame that includes the selectable hotspot in a second activation region different from the first activation region, and means for determining whether a second position of the cursor is outside of the second activation region of the second video frame. In addition, the system includes means for presenting, responsive to the determination, the second video frame with a visual indicator associating the cursor with the selectable hotspot based on the established association between the cursor and the selectable hotspot.

In another aspect of the subject matter disclosed herein, a system for automatically linking a cursor to a hotspot in a hypervideo stream includes a hypermedia player component and a graphical user interface manager component. The hypermedia player component is configured for establishing an association between a selectable hotspot in a first activation region of first video frame received for presentation in a video presentation space and a cursor when a first position of the cursor is within the first activation region corresponding to the selectable hotspot, for receiving a second video frame that includes the selectable hotspot in a second activation region different from the first activation region, and for determining whether a second position of the cursor is outside of the second activation region of the second video frame. The graphical user interface manager component is configured for presenting, responsive to the determination, the second video frame with a visual indicator associating the cursor with the selectable hotspot based on the established association between the cursor and the selectable hotspot.

In another aspect of the subject matter disclosed herein, a computer readable medium containing a computer program, executable by a machine, for automatically linking a cursor to a hotspot in a hypervideo stream includes executable instructions for establishing an association between a selectable hotspot in a first activation region of a first video frame received for presentation in a video presentation space and a cursor when a first position of the cursor is within the first activation region corresponding to the selectable hotspot, for receiving a second video frame that includes the selectable hotspot in a second activation region different from the first activation region, for and determining whether a second position of the cursor is outside of the second activation region of the second video frame. The computer readable medium also includes instructions for presenting, responsive to the determination, the second video frame with a visual indicator associating the cursor with the selectable hotspot based on the established association between the cursor and the selectable hotspot.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Methods, systems, and computer program products for associating a cursor with a hotspot in a hypervideo stream are disclosed. According to one embodiment, a hypervideo stream comprises a plurality of video frames that include at least one selectable hotspot. The video frames are received by a hypermedia player in a client device and presented to a user. The hypermedia player is configured to determine when a cursor, controlled by the user, is positioned within an activation region associated with a selectable hotspot. When such a determination is made, the hypermedia player establishes an association between the cursor and the hotspot such that the cursor is visually and logically linked to the selectable hotspot, and therefore the element associated with the hotspot.

In one embodiment, when the cursor is no longer positioned within the activation region associated with the selectable hotspot, a visual indicator is generated that visually represents the association between the cursor and the hotspot. The visual indicator can be implemented in many ways. For example, it can be implemented by changing the brightness or tint in the activation region associated with the hotspot, by outlining the activation region with a wireframe border, or by adding a connector from the cursor to the activation region. In addition, because the cursor is logically associated with the hotspot, an activation input event can be submitted to initiate an action corresponding to the hotspot without first having to position the cursor in the activation region.

By visually and logically linking the cursor to the hotspot, the user can be aware of the association between the cursor and the hotspot and has time to consider whether to activate the hotspot without needing to manually track the element while it moves. When a selection is made, the user can be assured that the activated hotspot is associated with the intended element.

Figure 1A:
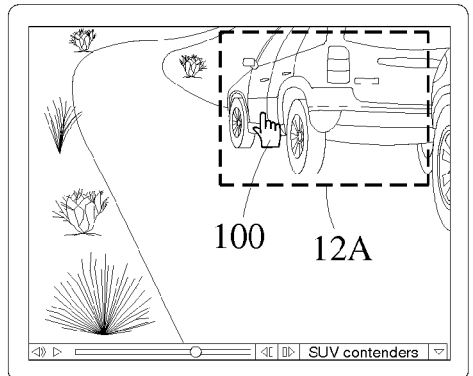
FIGS. 1A-1C illustrate a plurality of video frames of an exemplary hypervideo stream including hotspots according to an exemplary embodiment.
Figure 1A:
Figure 1B:
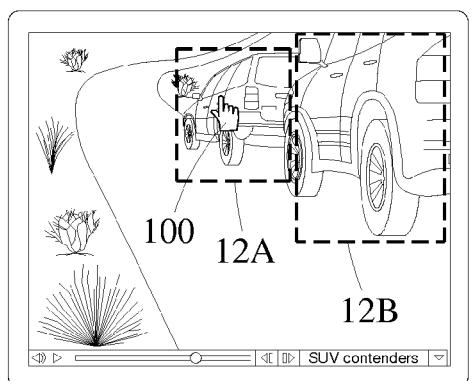
Figure 1B:
Figure 1C:
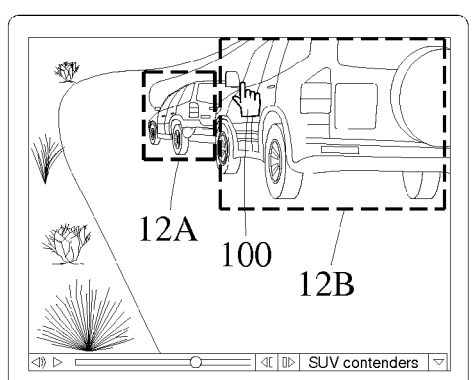
Figure 1C:
Figure 2:
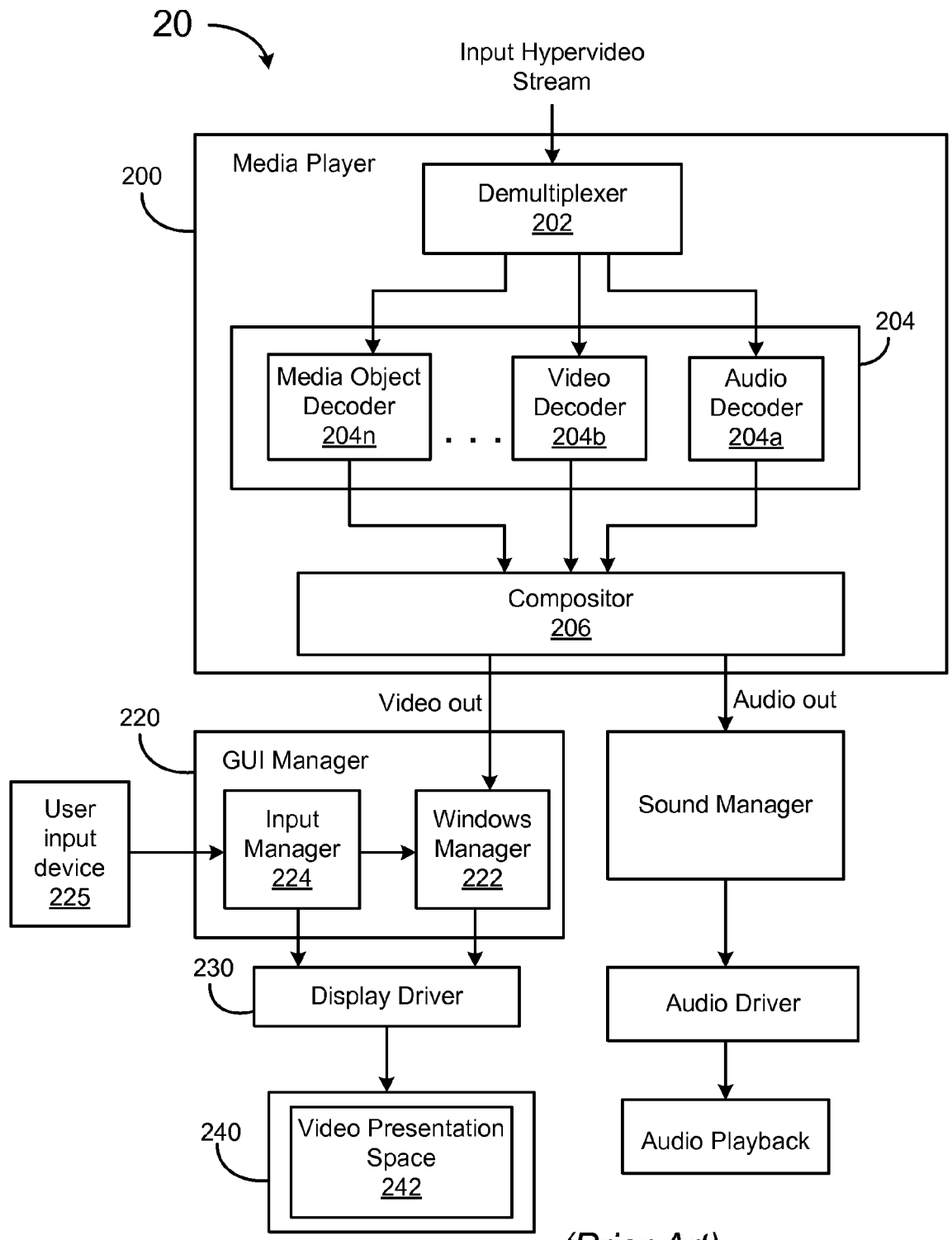
FIG. 2 is a block diagram illustrating a typical client device including a media player according to one embodiment.

FIG. 2 is a block diagram illustrating a standard client device according to one embodiment. The device 20 includes a media player 200, a graphical user interface (GUI) manager component 220, a display driver 230, a display 240, and other components related to presenting a hypervideo stream to the user. In one embodiment, the media player 200 can be an MPEG-4 media player, as described at http://www.chiariglione.org/mpeg/standards/mpeg-4/mpeg-4.htm ("Overview of the MPEG-4 Standard," Apr. 19, 2007). In this embodiment, the media player 200 includes a demultiplexer 202, a decoder 204, comprising a set of data-specific decoders 204a, 204b, 204n, and a compositor 206.

As stated above, a hypervideo stream comprises a plurality of video frames, each of which includes a plurality of data objects capturing a moment in time. For example, the data objects can include video objects, audio objects, and other media objects such as subtitles, images, 3D objects, hotspots and scene description information. During transmission and/or storage, the plurality of data objects are typically encoded, e.g., compressed, and multiplexed to improve transmission efficiencies and/or to reduce storage requirements. Thus, when a video frame of the input hypervideo stream is received by the hypermedia player 200, the demultiplexer 202 separates and reconstructs each separate encoded data object in the video frame.

The reconstructed encoded data objects are received by a data-specific decoder 204a, 204b, 204n compatible with the format of the data object. For example, an MPEG encoded video data object is received and decoded by a video data decoder 204a, an MPEG encoded audio data object is received and decoded by an audio data decoder 204b, and the MPEG encoded media objects are received and decoded by the media object decoder 204n. Typically, the decoding process recovers the data in an object from its encoded form and performs the necessary operations to restore the original object so that it is ready for rendering on the appropriate device 20. For example, a common function of the decoder 204a, 204b, 204n is decompression. The restored data objects and scene description information are passed to the compositor 206, which synchronizes the restored data objects and renders the video frame for presentation to the user.

After the compositor 206 synchronizes the data objects and renders the video frame, the compositor 206 passes the video frame to a windows manager 222 within the GUI manager component 220. The windows manager 222 manages the placement and appearance of windows in the display 240. It renders the video frame received from the compositor 206 into a video presentation space 242 in the display 240, composites the video window with other windows and other visual components and provides the resulting screen to the display driver 230 for presentation to the user.

Once the video frame including the hotspot is presented in the video presentation space 242, an action corresponding to the hotspot can be initiated when the media player 200 receives an indication that the cursor is in the activation region associated with the hotspot and an input activation event associated with the action. The indication can be received via an input device 225, e.g., a press pad, trackball, joystick, touch sensitive display, mouse, keypad or any other human-computer interface, and processed by an input manager 224 in the GUI manager component 220.

The input activation event can be any event, such as a right/left-click mouse input. In one embodiment, different input activation events can initiate different actions. For instance, a left-click mouse input can launch a URL and a right-click mouse input can display information about the element associated with the hotspot. Other activation events can launch other actions. For example, one activation event can initiate an action that affects the playing of the hypervideo stream by stopping or pausing it, changing the playback speed and/or direction, or jumping to another location in the stream. Another activation event can initiate an action that causes new information to be displayed from other media sources. Another activation event can initiate an action that does not affect the video stream or the presentation of other media streams or information. For example, the action could initiate the purchase of an item, send an email, add an entry to a task list, or trigger an agent.

The initiation of any action corresponding to the hotspot, however, depends on the user's ability to move the cursor into the activation region associated with the hotspot and, in most cases, to perform the input activation event, e.g., left-click mouse input, while keeping the cursor in the activation region of the hotspot. For numerous reasons, tracking the hotspot with the cursor via the input device 225 can be difficult and neither the input device 225 nor the input manager 224 can provide assistance to the user who is attempting to track a moving hotspot in a video clip.

Figure 3:
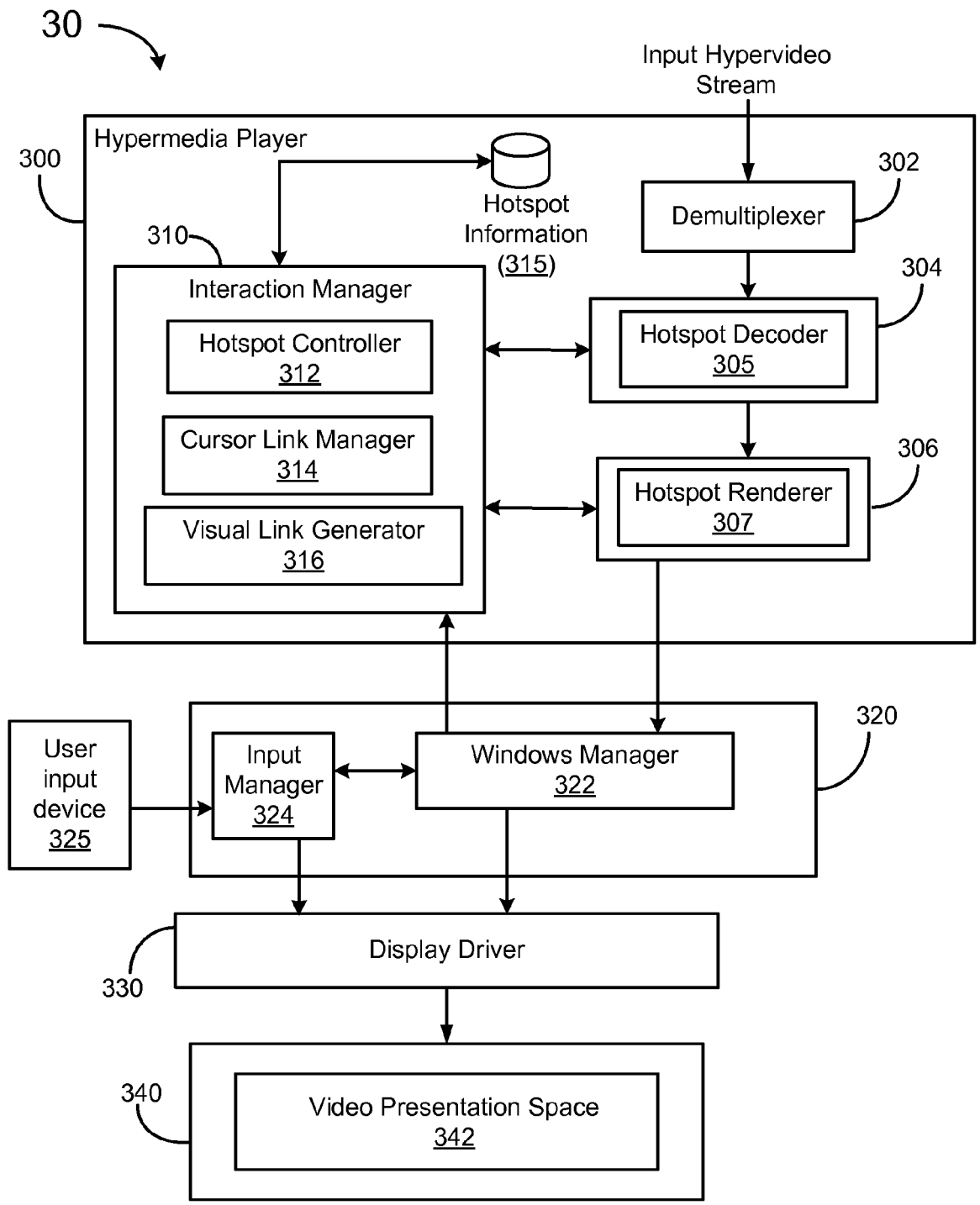
FIG. 3 is a block diagram illustrating a client device including an exemplary system for automatically linking a cursor to a hotspot in a hypervideo stream according to an exemplary embodiment.

FIG. 3 is a block diagram illustrating a client device including an exemplary system for automatically linking a cursor to a hotspot in a hypervideo stream according to an exemplary embodiment. In one embodiment, the device 30 includes a hypermedia player 300, a GUI manager component 320 and a display 340 including a video presentation space 342. The hypermedia player 300, in this embodiment, includes a demultiplexer 302, a decoder 304, comprising a hotspot decoder 305, and a compositor 306, including a hotspot renderer 307. A display driver 330 and input device 325, similar to those described in FIG. 2, are also shown.

Each video frame of the input hypervideo stream is received by the demultiplexer 302, which separates the video frame into its encoded data objects including the audio data object, the video data object, and media objects including at least one hotspot media object. A hotspot media object defines a hotspot and is encoded separately from, but associated with, the video frame. The hotspot decoder 305 receives the encoded hotspot media object, decodes it, and restores the hotspot media object.

In one embodiment, the hotspot media object includes hotspot information that can include: action information, such as a URL to be launched when the hotspot is selected; hover information to be displayed when the cursor hovers over the hotspot for a predetermined time period; location information that defines where an activation region associated with the hotspot is located in the video frame; visual information, such as an icon that can be used to represent the hotspot; and/or three-dimensional information that indicates in which spatial plane the activation region of the hotspot is located in relation to other hotspot activation regions.

The restored hotspot media object is passed to the hotspot renderer 307 in the compositor 306 so that the corresponding hotspot can be properly composed with the remainder of the scene and rendered to the user.

According to an exemplary embodiment, the hypermedia player 300 includes an interaction manager component 310 configured for managing user interaction with hotspots in the presented video frames of the hypervideo stream. In one embodiment, the interaction manager component 310 is configured to establish a visual and logical association between the cursor and a hotspot when the user moves the cursor within an activation region associated with the hotspot, and to present a visual indicator representing the association in subsequent video frames when the cursor is outside of the activation region associated with the hotspot.

Figure 4:
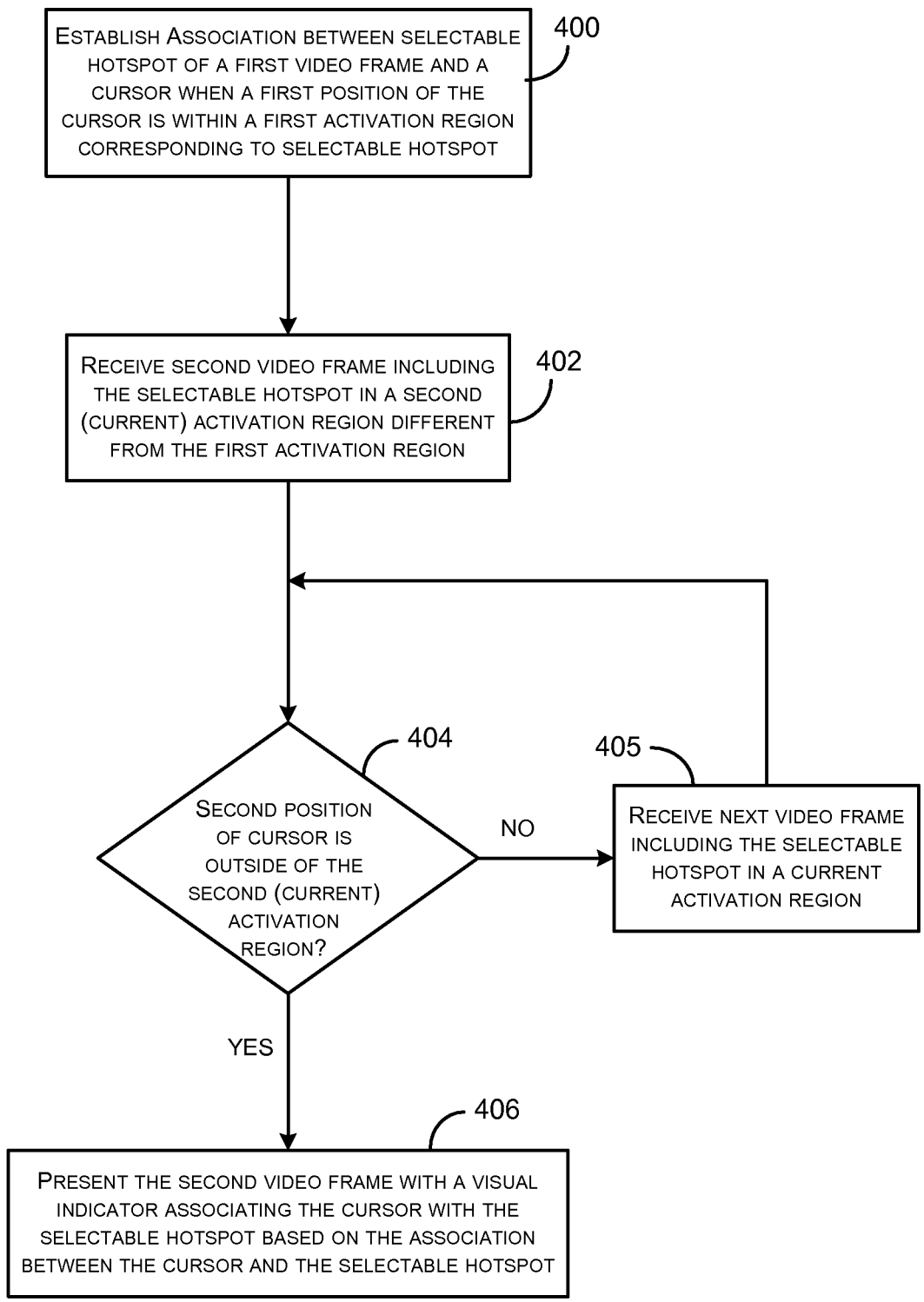
FIG. 4 is a flowchart illustrating a method for automatically linking a cursor to a hotspot in a hypervideo stream according to an exemplary embodiment.

FIG. 4 is a flowchart illustrating an exemplary method for linking a cursor to a hotspot in a hypervideo stream according to one embodiment. Referring to FIG. 3 and FIG. 4, the exemplary process begins when the hypermedia player 300 establishes an association between a selectable hotspot in a first activation region of a first video frame received for presentation in a video presentation space 342 and a cursor when a first position of the cursor is within the first activation region corresponding to the selectable hotspot (block 400). According to an exemplary embodiment, the device 30 includes means for establishing the association between the hotspot and the cursor. For example, the interaction manager component 310 in the hypermedia player 300 can be configured to perform this function.

In one embodiment, the demuliplexer 302, as stated above, receives and demuliplexes the hypervideo stream into a plurality of data objects including one or more hotspot media objects corresponding to one or more selectable hotspots. The hotspot media objects are decoded by the hotspot decoder component 305, which then passes the decoded hotspot media objects to the interaction manager component 310. The interaction manager component 310 includes a hotspot controller component 312 for managing and storing the hotspot media objects for the hypervideo stream in a hotspot list. In one embodiment, each hotspot media object is associated with a hotspot identifier, which can be provided by the hotspot decoder component 305 in one embodiment, or by the hotspot controller component 312 in another embodiment. The hotspot controller component 312 stores the hotspot identifier and the hotspot information of the hotspot media object in the hotspot list in a data store 315.

When subsequent video frames are received and decoded, the hotspot controller component 312 can receive new hotspot information relating to an existing hotspot media object. In an embodiment where the hotspot identifier is provided by the decoder 305, the hotspot controller component 312 can use the received hotspot identifier to locate and update the stored hotspot information in the hotspot list. In another embodiment where the hotspot identifier is not provided by the decoder 305, the hotspot controller component 312 can compare a portion of the received hotspot information, e.g., the action information or the hover information, to the stored hotspot information to determine to which hotspot media object on the list the received hotspot information relates. For instance, the action information of a hotspot media object can be used to determine a match because this information typically does not change. When the hotspot controller component 312 is not able to determine a match, the hotspot controller component 312 can associate a new hotspot identifier with the received hotspot information and add the new hotspot identifier and information to the hotspot list.

According to one embodiment, when the video frame including the selectable hotspot is presented in the video presentation space 342, a determination is made as to whether the cursor is within the activation region corresponding to the selectable hotspot. According to an exemplary embodiment, the hotspot controller component 312 in the hypermedia player 300 can be configured to receive cursor position information from the input manager 324 via the windows manager 322 in the GUI manager component 320 and to determine whether the cursor is within the activation region.

In one embodiment, when the cursor position information is received, the hotspot controller component 312 can compare the received cursor position information to the location information of the hotspot media objects in the hotspot list and can determine whether the cursor is within the activation region associated with the selectable hotspot. In one embodiment, the cursor can be considered to be within the activation region of the hotspot when the cursor position is at or within the boundaries of the activation region. When two or more activation regions of two or more hotspots are adjoining or overlapping, the determination can be based on other factors. For example, when the cursor position is within an overlapping section of first and second activation regions associated with first and second hotspots, the cursor can be considered to be within the activation region of the first hotspot when the cursor position is closer to a center of the first activation region than to a center of the second activation region. Alternatively, the cursor can be considered to be within neither the first nor the second activation regions.

When it is determined that the position of the cursor is within the activation region corresponding to the selectable hotspot, the hotspot controller component 312 establishes the association between the cursor and the selectable hotspot. In one embodiment, the hotspot controller component 312 can notify a cursor link manager component 314 and pass the hotspot identifier of the selectable hotspot to the cursor link manager component 314. The cursor link manager component 314 receives and records the hotspot identifier in a temporary storage buffer or cache (not shown). Optionally, the position of the cursor can also be received and recorded.

According to the exemplary method, once the cursor is associated with the hotspot, the hypermedia player 300 receives, for presentation in the video presence space 342, a second video frame including the selectable hotspot in a second activation region of the second video frame, where the second activation region is different from the first activation region (block 402). For example, the second activation region of the hotspot in the second video frame can be different from the first activation region in the first video frame when the hotspot tracks a moving element in the hypervideo stream. According to an exemplary embodiment, the device 30 includes means for receiving the hypervideo stream of the second video frame. For example, the demultiplexer 302 in the hypervideo player 300 can be configured to perform this function.

In an exemplary embodiment, the second video frame is processed in the manner described above. That is, the demuliplexer 302 receives the video frame and demultiplexes it into the plurality of data objects including one or more hotspot media objects corresponding to one or more selectable hotspots. The hotspot media objects are decoded by the hotspot decoder component 305, which then passes the decoded hotspot media objects to the hotspot renderer 307 for presentation to the user, and to the hotspot controller component 312 for updating and/or storing the hotspot information of the hotspot media objects in the data store 315.

In this embodiment, the second video frame includes a hotspot media object associated with the selectable hotspot, which is an existing hotspot media object in the hotspot list. Accordingly, the hotspot controller component 312 will receive new hotspot information for the selectable hotspot, which, at a minimum, includes new location information defining where the second activation region is located in the second video frame. The existing location information of the selectable hotspot will be updated with the new location information.

In one exemplary embodiment, when the hotspot information of an existing hotspot media object has been updated, the hotspot controller component 312 can notify the cursor link manager component 314 and can pass the hotspot identifier of the updated hotspot media object to the cursor link manager component 314. The cursor link manager component 314 receives the hotspot identifier and can determine whether the received hotspot identifier matches the recorded hotspot identifier. When such a match is not determined, e.g., because the cursor is not associated with the hotspot associated with the received hotspot identifier, no action is taken.

When the received hotspot identifier matches the recorded hotspot identifier, e.g., because the cursor has been associated with the hotspot corresponding to the received hotspot identifier, it is determined whether a second position of the cursor is outside of the second activation region of the second video frame (block 404). According to an exemplary embodiment, the device 30 includes means for making this determination. For example, the interaction manager component 310 in the hypermedia player 300 can be configured for determining whether the second position of the cursor is outside of the second activation region.

According to one embodiment, when the cursor link manager component 314 determines that the received hotspot identifier matches the recorded hotspot identifier, it notifies the hotspot controller component 312 and optionally passes the matching hotspot identifier to the hotspot controller component 312. The hotspot controller component 312 uses the identifier to retrieve the new location information that defines where the second activation region is located in the second video frame.

In one embodiment, the hotspot controller component 312 also receives cursor position information corresponding to a second or current cursor position from the input manager 324 via the windows manager 322, and compares the received cursor position information to the updated location information defining the second activation region. Based on this comparison, the hotspot controller component 312 can determine whether the second cursor position is outside of the second activation region.

When the second cursor position is determined not to be outside of the second activation region (block 404), no action is taken, and in one embodiment, a next video frame of the hypervideo stream is received, decoded, and processed according to block 404. When the second cursor position is determined to be outside of the second activation region (block 404), the hotspot controller component 312 can notify a visual link generator component 316.

According to one embodiment, the visual link generator component 316 is configured to generate a visual indicator representing the association between the cursor and the selectable hotspot. The visual link generator component 316 can receive or retrieve the updated/current hotspot information corresponding to the selectable hotspot and the cursor position information corresponding to the second cursor position. Using this information, the visual link generator component 316 can create the visual indicator representing the association between the cursor and the selectable hotspot.

The visual indicator can take any form that conveys to the user the current association between the cursor with the hotspot. For example, in one embodiment, the visual indicator can be implemented as a connector linking the cursor to the selectable hotspot. In this embodiment, the visual link generator component 316 can determine an edge of the second activation region closest to the second cursor position, or a center of the second activation region, which can be a geometric center, a center of gravity, or a visual center, and generate a connector from the second position of the cursor to one of the determined closest edge, center, center of gravity, and visual center of the second activation region. In another example, the visual indicator can be implemented by altering a brightness, tint and/or color of the second video frame in the second activation region.

Alternatively, or in addition, the visual indicator can be implemented by altering an appearance of the cursor. For example, the cursor can be directed to point to the element associated with the hotspot, the cursor can be replaced with an icon representing the element, and/or the icon can be placed next to the cursor. In yet another example, the visual indicator can be a wireframe border outlining the second activation region. Certainly, other examples of the visual indicator can be implemented and the subject matter described herein is in no way limited to the examples above.

According to the exemplary method, the second video frame is presented with the visual indicator associating the cursor with the selectable hotspot based on the association between the cursor and the selectable hotspot (block 406). The device 30, in one embodiment, includes means for presenting the second video frame with the visual indicator associating the cursor with the selectable hotspot. For example, the GUI manager component 320 can be configured for performing this function.

In one embodiment, after the visual link generator component 316 generates the visual indicator associating the cursor with the hotspot, the visual link generator component 316 can pass the visual indicator to the hotspot renderer 307 in the compositor 306. The hotspot renderer 307 and the compositor 306 interoperate with the windows manager 322 in the GUI manager component 320 to present the visual representation of the video frame including the visual indicator associating the cursor with the selectable hotspot in the video presentation space 342 presented on the display 340. In one embodiment, the visual indicator can be presented constantly, periodically, or in response to a user input.

Figure 5A:
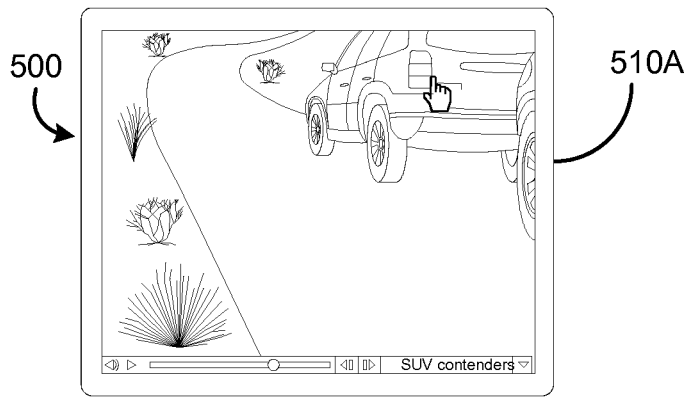
FIGS. 5A-5C illustrate exemplary video frames including a selectable hotspot and a visual indicator associating the cursor with the selectable hotspot according to an exemplary embodiment.
Figure 5B:
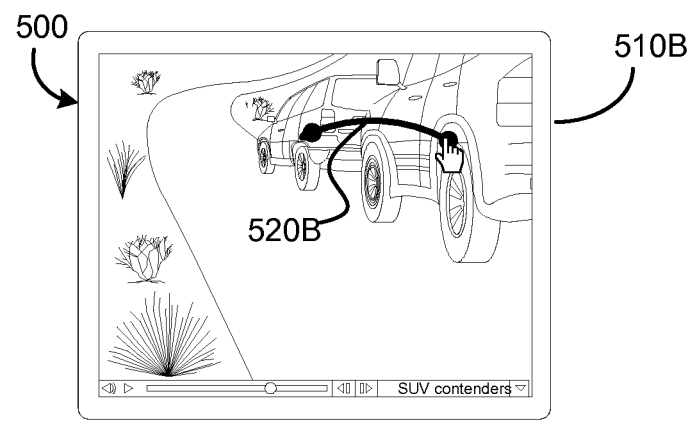
Figure 5C:
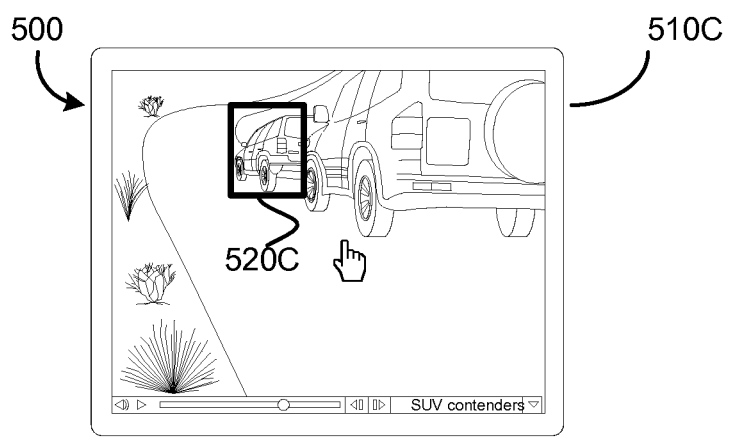

FIGS. 5A-5C are exemplary windows that display video frames of a hypervideo stream in a video presentation space according to one embodiment. In FIG. 5A, a first video frame 510A is presented in the video presentation space 500. The first video frame 510A depicts two elements, in particular, the rear of a first car and a front of a second car. The first video frame 510A includes a selectable hotspot associated with the first car in a first activation region, and the cursor position is within the activation region corresponding to the selectable hotspot, i.e., the cursor is over the first car. Assuming the cursor is not yet associated with a hotspot, the interaction manager component 310 associates the cursor with the selectable hotspot corresponding to the first car.

In FIG. 5B and FIG. 5C, a second video frame 510B, 510C is presented in the video presentation space 500. The second video frame 510B, 510C includes the selectable hotspot in a second activation region that is different from the first activation region, e.g., because the first car is moving. The cursor is now outside of the second activation region. Nevertheless, the cursor remains associated with the selectable hotspot, as indicated by the visual indicator, e.g., the connector 520B in FIG. 5B and the frame 520C in FIG. 5C.

According to an exemplary embodiment, the cursor is associated with the selectable hotspot visually as well as logically. Thus, regardless of whether the cursor is within the current activation region of the selectable hotspot, an action corresponding to the selectable hotspot can be initiated by simply performing the input activation event associated with the action. For example, in one embodiment, when the input activation event is a select input, e.g., a left-click mouse input, the action associated with selecting the first hotspot is initiated even when the cursor is outside of the hotspot's current activation region. Alternatively, or in addition, when the cursor is associated with the hotspot for a first predetermined time period and the hotspot has not been activated, i.e., selected, the hover information of the hotspot can be provided to the user. In this manner, the user can easily view the hover information without worrying about manually tracking the hotspot.

In another embodiment, the association is maintained even when the element with which the hotspot is associated is completely or partially covered by another element. In this case, because the cursor remains associated with the hotspot, the user can activate the hotspot without the risk of activating another hotspot that overlaps or completely encompasses the associated hotspot.

In some instances, the selectable hotspot is not associated with subsequently received video frames. For example, when the element associated with the hotspot disappears from the video clip because the camera pans away from the element, the subsequent video frames will not be associated with the selectable hotspot. In this case, the association between the cursor and the selectable hotspot can be maintained, in one embodiment, for a second predetermined time period even when the selectable hotspot is not associated with subsequently received video frames. Because the association between the cursor and the hotspot is maintained, the user can still activate the hotspot within the second predetermined time period even when the element and the hotspot are no longer presented to the user. Moreover, when the element reappears in the video clip within the second predetermined time period, the visual indicator can be presented again to represent visually the association between the cursor and the hotspot.

In an exemplary embodiment, the cursor can be associated with the selectable hotspot until the second predetermined time period expires, or until another predetermined time period expires. Alternatively, or additionally, the cursor can be disassociated with the selectable hotspot in response to a command, a request or an indication to unlock the cursor.

Although embodiments have been described using a hypermedia player 300 configured for MPEG-4 encoded video streams, other video stream encodings and media players can be used, such as Quicktime® or Flash®. For example, QuickTime® offers support for sprites, which are object-based animations in a layer that is separate from, but synchronized with, the video layer. In MPEG-4 terminology, a sprite is a media object separate from the video media object. The sprite animations can be included in the user presentation, or not, by setting of a visibility flag. Wired sprites are sprites that react to user interaction and respond to user events such as mouse-over (hover) and mouse-down (selection). Wired sprites are aware of their own boundaries and track when the user is potentially interacting with them. They also keep track of which actions to perform for which user events. Flash® supports interactivity with ActionScripts, which handle animations and mouse events such as selection.

Through aspects of the embodiments described, a cursor is linked visually and logically to a hotspot. By logically linking the cursor to the hotspot, the user has time to consider whether to activate the hotspot without needing to manually track the element while it moves. It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any medium that can contain, store, communicate, propagate, or transport instructions for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a portable digital video disc (DVD), a wired network connection and associated transmission medium, such as an ETHERNET transmission system, and/or a wireless network connection and associated transmission medium, such as an IEEE 802.11 (a), (b), or (g) or a BLUETOOTH transmission system, a wide-area network (WAN), a local-area network (LAN), the Internet, and/or an intranet.

Thus, the subject matter described herein can be embodied in many different forms, and all such forms are contemplated to be within the scope of what is claimed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for automatically linking a cursor to a hotspot in a hypervideo stream, wherein the hypervideo stream comprises a plurality of video frames that are associated with at least one user selectable hotspot, the method comprising:
   establishing an association between a selectable hotspot in a first activation region of a first video frame received for presentation in a video presentation space and a cursor when a first position of the cursor is within the first activation region corresponding to the selectable hotspot;
   receiving, for presentation in the video presentation space, a second video frame including the selectable hotspot in a second activation region of the second video frame, wherein the second activation region is different from the first activation region;

determining that a second position of the cursor is outside of the second activation region of the second video frame; and responsive to the determination, presenting the second video frame with a visual indicator associating the second position of the cursor with the second activation region based on the association between the cursor and the selectable hotspot.

2. The method of claim 1 wherein the first video frame comprises a hypervideo stream and after receiving the first video frame the method further includes:

separating the hypervideo stream into a plurality of data objects including a hotspot media object corresponding to the selectable hotspot, wherein the hotspot media object includes hotspot information comprising location information indicating where the activation region corresponding to the selectable hotspot is located in the video frame, and at least one of action information indicating an action to be initiated when the hotspot is activated, hover information to be provided when the cursor is positioned within the activation region corresponding to the hotspot for a first predetermined time period, and visual information associated with the hotspot.

3. The method of claim 2 wherein after separating the hypervideo stream into the plurality of data objects including the hotspot media object corresponding to the selectable hotspot, the method further comprises:

associating the hotspot media object with a hotspot identifier;

storing the hotspot identifier and the hotspot information of the hotspot media object; and recording the hotspot identifier corresponding to the selectable hotspot when the first position of the cursor is within the first activation region corresponding to the selectable hotspot of the first video frame.

4. The method of claim 3 wherein after receiving the second video frame, the method includes updating the location information of the hotspot media object corresponding to the selectable hotspot with information indicating the second activation region.

5. The method of claim 4 wherein after updating the location information of the hotspot media object, the method includes:

determining that the hotspot identifier of the hotspot media object associated with the updated location information matches the recorded hotspot identifier; and generating, for presentation in the video presentation space, the visual indicator based on the updated location information.

6. The method of claim 2 including:

providing the hover information of the hotspot media object corresponding to the selectable hotspot when the cursor is associated with the selectable hotspot for the first predetermined time period and the hotspot has not been activated.

7. The method of claim 1 including disassociating the cursor with the selectable hotspot in response to receiving one of a command, a request, and an indicator to unlock the cursor.

8. The method of claim 1 including:

receiving a third video frame that does not include the selectable hotspot;

maintaining the association between the cursor and the selectable hotspot for a second predetermined time period; and initiating an action corresponding to the selectable hotspot in response to receiving an activation input event within the second predetermined time period.

9. The method of claim 8 further including:

receiving a fourth video frame within the second predetermined time period, the fourth video frame including the selectable hotspot in a fourth activation region; and presenting the fourth video frame with the visual indicator associating the position of the cursor with the fourth activation region based on the maintained association between the cursor and the selectable hotspot.

10. The method of claim 1 wherein the selectable hotspot is a primary hotspot associated with the cursor, the method further including:

receiving a third video frame including the primary hotspot in a primary activation region of the third video frame and a secondary hotspot in a secondary activation region of the third video frame;

determining that at least a portion of the primary activation region is within at least a portion of the secondary activation region;

maintaining the association between the cursor and the primary hotspot; and initiating an action corresponding to the primary hotspot in response to receiving an activation input event.

11. The method of claim 1 wherein presenting the second video frame with the visual indicator includes determining one of a closest edge, a center, a center of gravity, and a visual center of the second activation region, and generating, for presentation in the video presentation space, a connector from the second position of the cursor to one of the determined closest edge, center, center of gravity, and visual center of the second activation region.

12. The method of claim 1 wherein presenting the second video frame with the visual indicator includes at least one of presenting a wireframe border outlining the second activation region, altering one of a brightness, tint and color of the second video frame in the second activation region, and altering an appearance of the cursor, and wherein the visual indicator is presented at least one of constantly, periodically, or in response to user input.

13. A system for automatically linking a cursor to a hotspot in a hypervideo stream, wherein the hypervideo stream comprises a plurality of video frames that are associated with at least one user selectable hotspot, the system comprising:

means for establishing an association between a selectable hotspot in a first activation region of a first video frame received for presentation in a video presentation space and a cursor when a first position of the cursor is within the first activation region corresponding to the selectable hotspot;

means for receiving, for presentation in the video presentation space, a second video frame including the selectable hotspot in a second activation region of the second video frame, wherein the second activation region is different from the first activation region;

means for determining that a second position of the cursor is outside of the second activation region of the second video frame; and means for presenting, responsive to the determination, the second video frame with a visual indicator associating the second position of the cursor with the second activation region based on the association between the cursor and the selectable hotspot.

14. A system for automatically linking a cursor to a hotspot in a hypervideo stream, wherein the hypervideo stream comprises a plurality of video frames that are associated with at least one user selectable hotspot, the system comprising:
- a hypermedia player component configured for establishing an association between a selectable hotspot in a first activation region of a first video frame received for presentation in a video presentation space and a cursor when a first position of the cursor is within the first activation region corresponding to the selectable hotspot, for receiving a second video frame including the selectable hotspot in a second activation region of the second video frame, wherein the second activation region is different from the first activation region, and for determining that a second position of the cursor is outside of the second activation region of the second video frame; and
- a graphical user interface manager component configured for presenting, responsive to the determination, the second video frame with a visual indicator associating the second position of the cursor with the second activation region based on the association between the cursor and the selectable hotspot.

15. The system of claim 14 wherein the first video frame comprises a hypervideo stream and the hypermedia player component includes:
- a demultiplexer component configured for receiving and separating the hypervideo stream into a plurality of data objects including a hotspot media object corresponding to the selectable hotspot, wherein the hotspot media object includes hotspot information comprising location information indicating where the activation region corresponding to the selectable hotspot is located in the video frame; and
- an interaction manager component configured for associating the hotspot media object with a hotspot identifier, for storing the hotspot identifier and the hotspot information of the hotspot media object, for recording the hotspot identifier corresponding to the selectable hotspot when the first position of the cursor is within the first activation region corresponding to the selectable hotspot of the first video frame, for updating the hotspot information when the second video frame is received and separated, for generating the visual indicator based on the updated location information, and for disassociating the cursor with the selectable hotspot in response to receiving one of a command, a request, and an indicator to unlock the cursor.

16. The system of claim 15 wherein the hotspot information includes at least one of action information indicating an action to be initiated when the hotspot is activated and hover information to be provided when the cursor is positioned within the activation region corresponding to the selectable hotspot for a first predetermined time period, and the interaction manager component is configured for at least one of providing the hover information of the hotspot media object corresponding to the selectable hotspot when the cursor is associated with the selectable hotspot for the first predetermined time period and the hotspot has not been activated, and initiating the action indicated by the action information of the hotspot media object corresponding to the selectable hotspot when an activation input event is received.

17. The system of claim 14 wherein when a third video frame is received and the selectable hotspot is not associated with the third video frame, the hypermedia player component is configured for maintaining the association between the cursor and the selectable hotspot for a second predetermined time period, and for initiating an action corresponding to the selectable hotspot in response to receiving an activation input event within the second predetermined time period.

18. The system of claim 17 wherein when a fourth video frame is received within the second predetermined time period and the fourth video frame includes the selectable hotspot in a fourth activation region, the hypermedia player component is configured for presenting the fourth video frame with the visual indicator associating the position of the cursor with the second activation region based on the maintained association between the cursor and the selectable hotspot.

19. The system of claim 14 wherein the selectable hotspot is a primary hotspot associated with the cursor and when a third video frame is received and includes the primary hotspot in a primary activation region of the third video frame and a secondary hotspot in a secondary activation region of the third video frame, the hypermedia player component is configured for determining that at least a portion of the primary activation region is within at least a portion of the secondary activation region, for maintaining the association between the cursor and the primary hotspot, and for initiating an action corresponding to the primary hotspot in response to receiving an activation input event.

20. The system of claim 14 wherein the hypermedia player component is configured for determining one of a closest edge, a center, a center of gravity, and a visual center of the second activation region, and generating, for presentation in the video presentation space, one of a connector from the second position of the cursor to one of the determined closest edge, center, center of gravity, and visual center of the second activation region.

21. The system of claim 14 wherein the graphical user interface manager component is configured for at least one of presenting a wireframe border outlining the second activation region, altering one of a brightness, tint and color of the second video frame in the second activation region, and altering an appearance of the cursor, wherein the visual indicator is presented at least one of constantly, periodically, or in response to user input.

22. A non-transitory computer readable medium containing a computer program, executable by a machine, for automatically linking a cursor to a hotspot in a hypervideo stream, wherein the hypervideo stream comprises a plurality of video frames that are associated with at least one user selectable hotspot, the computer program comprising executable instructions for:
- establishing an association between a selectable hotspot in a first activation region of a first video frame received for presentation in a video presentation space and a cursor when a first position of the cursor is within the first activation region corresponding to the selectable hotspot;
- receiving, for presentation in the video presentation space, a second video frame including the selectable hotspot in a second activation region of the second video frame, wherein the second activation region is different from the first activation region;
- determining that a second position of the cursor is outside of the second activation region of the second video frame; and
- responsive to the determination, presenting the second video frame with a visual indicator associating the second position of the cursor with the second activation region based on the association between the cursor and the selectable hotspot.

* * * * *